(12) United States Patent
Reid et al.

(10) Patent No.: US 7,207,405 B2
(45) Date of Patent: Apr. 24, 2007

(54) HYBRID POWER SUPPLY APPARATUS FOR BATTERY REPLACEMENT APPLICATIONS

(75) Inventors: Christopher E. J. Reid, Vancouver (CA); Adrian J. Corless, Vancouver (CA); David LeBoe, Vancouver (CA); Carolyn Lawrence, Vancouver (CA); Kenneth W. Kratschmar, Victoria (CA)

(73) Assignee: Cellex Power Products, Inc., Vancouver, British Columbia (CA)

( * ) Notice: Subject to any disclaimer, the term of this patent is extended or adjusted under 35 U.S.C. 154(b) by 0 days.

(21) Appl. No.: 10/684,622

(22) Filed: Oct. 14, 2003

(65) Prior Publication Data

US 2004/0245031 A1 Dec. 9, 2004

Related U.S. Application Data

(63) Continuation of application No. 09/785,878, filed on Feb. 16, 2001, now abandoned.

(51) Int. Cl.
*B60K 1/00* (2006.01)

(52) U.S. Cl. ................ 180/65.3; 180/65.1; 180/68.5; 187/222; 429/12

(58) Field of Classification Search ...... 180/65.1–65.4, 180/65.6–65.8, 298, 68.5; 700/297; 187/222; 429/12

See application file for complete search history.

(56) References Cited

U.S. PATENT DOCUMENTS

| | | | |
|---|---|---|---|
| 1,527,431 A | 2/1925 | Gumpper | |
| 3,497,027 A | 2/1970 | Wild | |
| 3,690,397 A | 9/1972 | Parker | |
| 3,756,350 A | 9/1973 | Gandolfo et al. | |
| 3,897,960 A | 8/1975 | Cosby | |
| 4,199,037 A | 4/1980 | White | |

(Continued)

FOREIGN PATENT DOCUMENTS

DE 43 21 768 A1 1/1995

(Continued)

OTHER PUBLICATIONS

Airtrax Corporation Press Release, Mar. 2000, Vineland, New Jersey USA.

(Continued)

*Primary Examiner*—J. Allen Shriver
(74) *Attorney, Agent, or Firm*—Oyen Wiggs Green & Mutala LLP

(57) ABSTRACT

This application relates to a hybrid power supply apparatus including a fuel cell and an energy storage device for use in off-road electric vehicles, such as lift trucks. The apparatus is a substitute for conventional lead acid batteries and is sized to fit within a conventional lift truck battery receptacle tray. The fuel cell and fuel processor systems are designed to meet the average load requirements of the vehicle, while the batteries and power control hardware are capable of responding to very high instantaneous load demands. The invention has a similar electrical interface as conventional battery systems and does not require vehicle modification. The apparatus is air-cooled to ensure that the hybrid power components operate within a preferred temperature range and to maintain the external surfaces of the apparatus and exhaust gases within safe temperature limits. Apart from vehicular applications, low power hybrid fuel cell products as exemplified by the present invention may also find application in uninterruptable power supply systems, recreational power, off-grid power generation and other analogous applications.

13 Claims, 15 Drawing Sheets

U.S. PATENT DOCUMENTS

| | | | |
|---|---|---|---|
| 4,325,451 A | 4/1982 | Umeda | |
| 4,339,015 A | 7/1982 | Fowkes et al. | |
| 4,593,786 A | 6/1986 | Tate | |
| 4,670,702 A | 6/1987 | Yamada et al. | |
| 4,839,246 A | 6/1989 | Takabayashi | |
| 4,839,574 A | 6/1989 | Takabayashi | |
| 4,878,877 A | 11/1989 | Auer et al. | |
| 4,883,724 A | 11/1989 | Yamamoto | |
| 4,931,947 A | 6/1990 | Werth et al. | |
| 4,961,151 A | 10/1990 | Early et al. | |
| 4,962,462 A | 10/1990 | Fekete | |
| 5,065,320 A | 11/1991 | Hayashi et al. | |
| 5,075,813 A | 12/1991 | Takabayashi | |
| 5,139,894 A | 8/1992 | Mizuno et al. | |
| 5,332,630 A | 7/1994 | Hsu | |
| 5,334,463 A | 8/1994 | Tajima et al. | |
| 5,591,015 A * | 1/1997 | Dantlgraber | 417/312 |
| 5,601,936 A | 2/1997 | Dudfield et al. | |
| 5,623,194 A | 4/1997 | Boll et al. | |
| 5,631,532 A | 5/1997 | Azuma et al. | |
| 5,710,699 A | 1/1998 | King et al. | |
| 5,714,874 A | 2/1998 | Bonnefoy | |
| 5,738,187 A | 4/1998 | Dammeyer et al. | |
| 5,759,712 A | 6/1998 | Hockaday | |
| 5,760,488 A | 6/1998 | Sonntag | |
| 5,780,980 A | 7/1998 | Naito | |
| 5,820,172 A | 10/1998 | Brigham et al. | |
| 5,845,583 A | 12/1998 | Jensen | |
| 5,929,595 A | 7/1999 | Lyons et al. | |
| 5,945,808 A | 8/1999 | Kikuchi et al. | |
| 6,011,379 A | 1/2000 | Singh et al. | |
| 6,214,484 B1 | 4/2001 | Hauer | |
| 6,242,873 B1 | 6/2001 | Drozdz et al. | |
| 6,874,588 B2 * | 4/2005 | Kato et al. | 180/65.3 |
| 6,959,475 B2 * | 11/2005 | Chernoff et al. | 29/402.08 |
| 6,978,855 B2 * | 12/2005 | Kubota et al. | 180/65.3 |
| 2001/0052433 A1 * | 12/2001 | Harris et al. | 180/68.5 |
| 2003/0070850 A1 * | 4/2003 | Reid et al. | 180/68.5 |
| 2003/0094324 A1 * | 5/2003 | Huang | 180/220 |
| 2004/0035617 A1 * | 2/2004 | Chaney | 180/65.1 |
| 2004/0129466 A1 * | 7/2004 | Leifert | 180/65.2 |
| 2004/0241521 A1 * | 12/2004 | Finkelshtain et al. | 429/34 |
| 2005/0029022 A1 * | 2/2005 | Kubusch et al. | 180/65.3 |
| 2005/0095500 A1 * | 5/2005 | Corless et al. | 429/100 |

FOREIGN PATENT DOCUMENTS

| | | |
|---|---|---|
| DE | 44 27 322 A1 | 2/1996 |
| DE | 196 41 254 A1 | 4/1998 |
| EP | 0 860 889 A1 | 8/1998 |
| EP | 0 936 178 A1 | 8/1999 |
| GB | 1129709 | 10/1968 |
| JP | 59134573 | 8/1984 |
| JP | 2000-85377 | 3/2000 |
| WO | WO 96/06749 | 3/1996 |
| WO | WO 99/02358 | 1/1999 |
| WO | WO 01/79012 A2 | 10/2001 |

OTHER PUBLICATIONS

Draft Final Report, Oct. 1999, Prepared for Naval Air Warfare Center Aircraft Division, Lakehurst, NJ 08733 USA.

Johnson, G. K. et al., "A Fuel Cell Power System for Forklift Trucks", EVC No. 8305, EVC Expo '83, Oct. 4-6, 1983.

Kaufman, A. et al., "Fuel Cell Power System for Forklift Truck", MERADCOM 30th Power Sources Symposium, Jun. 1982.

Dowgiallo, E.J. et al., "A Fuel Cell-Battery Power Source for Electric Vehicles", 782407E, The Fifth International Electric Vehicle Symposium, Oct. 1978.

O'Sullivan, J.B. et al., "Hybrid Power Source for Material Handling Equipment", IECEC 1975 Record.

Rainer, H., "Solar Hydrogen Project at Neunburg vorm Wald, Germany", XII World Hydrogen Energy Conference, Jun. 1998 (archived at http://www.solarhydrogen.com/pdfs/eng/publications_e_11.pdf).

J.J. Early et al., "An Integrated Fuel Cell/Battery Power System for a Forklift Truck", Journal of the Electrochemical Society, vol. 130, No. 8, Aug. 1983, p. 331C, abstract No. 376.

"Fuel Cells for Everyone", Siemens R & D Homepage, Feb. 1998.

* cited by examiner

HYBRID POWER SUPPLY APPARATUS FOR BATTERY REPLACEMENT APPLICATIONS

RELATED APPLICATION

This is a continuation of U.S. patent application Ser. No. 09/785,878 filed 16 Feb. 2001.

TECHNICAL FIELD

This application relates to a hybrid power supply apparatus comprising a fuel cell and an energy storage device suitable for use in electric off-road vehicles, such as lift trucks and ground support equipment. The invention is a substitute for conventional lead acid batteries and is sized to fit within a standard electric vehicle battery receptacle tray. Other low power product applications are also described.

BACKGROUND

Off-road electric vehicles, such as lift trucks, sweepers and scrubbers and ground support equipment, are used in a variety of commercial and recreational applications. By way of example, electric lift trucks comprising pallet forks are commonly used in retailing, wholesaling and manufacturing operations for lifting and moving materials inside warehouses and the like. Since lift trucks are often operated indoors, the use of internal combustion engines is precluded. In most cases lift trucks are battery powered to avoid potentially harmful emissions. Each battery is mounted within an enclosure comprising a battery receptacle tray or cavity typically located near the rear of the vehicle (although the location varies depending upon the vehicle model). The batteries typically include handles or lifting grips and the receptacle tray may include rollers to facilitate battery movement, for example during recharging operations. When in use, the battery output is electrically connected to the vehicle drive system with a DC interface plug.

Various types of lead acid battery systems are available for use in lift trucks and other similar electric vehicles. Flooded battery systems provide approximately 6–8 hours of operation and require frequent watering to maintain the chemistries in their cells as they are charged and discharged. Batteries requiring less frequent watering, such as "Waterless"™ battery systems manufactured by Hawker Powersource, are also available and provide similar performance to flooded batteries. Recently "maintenance free" battery systems have been introduced which do not require any watering, but require more expensive chargers. Maintenance-free systems have a lower energy storage capacity per cubic foot and therefore provide fewer hours of operation than flooded or reduced water batteries of the same size.

All conventional battery systems designed for low power vehicular applications suffer from serious shortcomings. A primary limitation is that conventional batteries must be recharged at frequent intervals, usually at least every 6–8 hours. Accordingly, battery charging stations must be provided at the worksite. The establishment of a battery charging infrastructure is costly and occupies valuable warehouse space. Moreover, the vehicles cannot be continuously operated (i.e. in sequential shifts) without routinely swapping discharged and charged batteries. This frequent daily removal of discharged batteries and substitution of fully charged batteries is labour-intensive and potentially dangerous (conventional battery enclosure systems for Class A lift trucks weigh up to 900 pounds). In order to be effective, such battery swapping also requires multiple batteries per vehicle which increases operating costs.

Conventional batteries must also be serviced at frequent intervals for cleaning and watering. The presence of battery acid poses employee safety risks and the potential to damage equipment.

Further, conventional battery systems are incapable of operating at optimum efficiency in many industrial applications. As shown in FIG. 14, lift trucks typically have a pattern of power usage or "duty cycle" which is characterized by loads which fluctuate substantially during the course of a work shift. For example, although the average load across an entire seven hour work shift is less than 1 kW, power requirements on the order of 8–10 kW for short durations are required at irregular intervals to meet operational demands. The state of charge of the battery must always be high enough to ensure that the battery is capable of responding to high current requests by the lift truck (even though the average power requirement is relatively low). This decreases the effective charge life of the battery, requiring recharging at more frequent intervals and resulting in operating downtimes.

The use of fuel cell power systems in industrial vehicles as an alternative to battery power is well known in the prior art. Fuel cell systems offer many important benefits including extended operating times, low emissions and the flexibility to utilize readily available fuels, such as methanol and propane (LPG). Further, the need for a battery charging infrastructure as described above is avoided, including the need for multiple batteries.

Notwithstanding these advantages, previous attempts by original equipment manufacturers (OEMs) to integrate fuel cell power systems employing conventional fuels into industrial trucks at a reasonable cost have been largely unsuccessful. It is not feasible to adapt existing trucks to fuel cell power without making extensive truck-level modifications. Each OEM brand truck requires a unique integration approach which is often difficult and expensive to implement, especially for existing fleets of vehicles. Moreover, if the fuel cell system fails, the truck must be taken out of service.

The fact that duty cycles for lift trucks and other similar vehicles are characterized by very high peak to average load ratios poses particular operational challenges. Many fuel cell systems employ reformers which convert conventional fuels into hydrogen-enriched gas which the fuel cell system transforms into electricity. However, this reforming process is relatively slow which limits the load following capabilities of the fuel cell. Also, in order to maximize the useful life of fuel cell components, it is preferable to operate the fuel cell at near steady state conditions rather than adopting a load following approach.

Some hybrid power supply systems are known in the prior art for use in applications subject to sudden load fluctuations. U.S. Pat. No. 4,883,724, Yamamoto, issued Nov. 28, 1989 relates to a control unit for a fuel cell generating system which varies the output of the fuel cell depending upon the state of charge of the battery. In particular, a DC/DC converter is connected between the output of the fuel cell and the battery and is responsive to a control signal produced by a controller. The purpose of the Yamamoto invention is to ensure the storage battery is charged for recovery within the shortest possible time to reach a target remaining charge capacity under charging conditions that do not cause deterioration of performance of the battery. When the charged quantity of the battery is recovered to the target value, the controller lowers the output of the fuel cell to its normal operating state. In the case of no external load, such as during extended periods of interruption in the operation of the lift truck, the fuel cell is controlled to stop after the storage battery is charged.

The primary limitation of the Yamamoto control system is that control algorithm is designed for prolonging the useful life of the storage battery rather than the fuel cell. By varying the fuel cell output to charge the storage battery for recovery within the shortest possible time, the long-term performance of the fuel cell is compromised. Moreover, Yamamoto does not disclose a hybrid fuel cell system which is configured to fit within a small geometric space.

The need has accordingly arisen for a hybrid architecture specifically adapted for lift trucks and other low power applications which integrates fuel cell technology with conventional battery systems. In the present invention the fuel cell and fuel processor systems are sized to meet the average load requirements of the vehicle, while the batteries and power control hardware are capable of responding to very high instantaneous load demands. The invention may be substituted for conventional batteries to improve performance without retrofitting existing fleets of vehicles. As described further below, the applicant's invention fits into conventional lift truck battery receptacle trays and has a similar electrical interface as conventional battery systems. Apart from vehicular applications, low power hybrid fuel cell products as exemplified by the present invention may also find application in uninterruptable power supply systems, recreational power, off-grid power generation and other analogous applications.

SUMMARY OF INVENTION

Conventional traction batteries are removably positionable within a battery receptacle tray of an electric vehicle and include a power output connectable to the vehicle drive system. In accordance with the invention, a hybrid power supply apparatus is provided which is interchangeable with such conventional batteries. The apparatus includes a fuel cell; an energy storage device chargeable by the fuel cell; a housing enclosing the fuel cell and the energy storage device, the housing being sized to fit within the battery receptacle tray; and a power output electrically connectable to the storage device and extending externally of the housing for electrically coupling the apparatus to the drive system of the vehicle when the housing is positioned within the battery receptacle tray.

Preferably the apparatus further includes a coolant system for flowing gas through the housing. The coolant system may include a gas inlet for drawing gas into the housing; at least one blower positioned within the housing for moving gas through the housing in predetermined flow paths to regulate the temperature of the apparatus; and a gas outlet for expelling exhaust gas from the housing. In a particular embodiment of the invention, the housing includes a user interface surface which is exposed when the housing is placed within the vehicle receptacle tray. Both the gas inlet and gas outlet are located on the user interface surface. The coolant system is configured so that the temperature of the exhaust gas and the user interface surface does not exceed 50° C. when the coolant system is in operation.

The apparatus further preferably includes a fuel processor positioned within the housing for converting a source of fuel to hydrogen-enriched gas for delivery to the fuel cell. In one preferred embodiment of the invention, the fuel processor is a reformer for converting conventional fuels, such as methanol and propane, to hydrogen gas. The apparatus may include a fuel storage chamber located within the housing which is in fluid communication with the fuel processor. A fuel inlet may be provided on the housing, such as on the user interface surface, for supplying fuel to the fuel storage chamber. In one embodiment, the fuel storage chamber is thermally isolated from the remainder of the housing.

The apparatus also preferably includes a DC/DC power converter positioned within the housing for converting the DC current generated by the fuel cell to a voltage suitable for delivery to the energy storage device, which may consist of a battery or capacitor, or to an external load. A controller may also be mounted within the housing for regulating operation of the fuel cell and power converter depending upon the state of charge of the energy storage device.

The apparatus is designed to closely simulate the weight characteristics of a conventional traction battery to ensure proper balancing of the electric vehicle. To this end, one or more load compensators may be positioned within the housing for increasing the weight of the apparatus to a weight approximating the weight of a conventional battery. Since fuel cell systems are more sensitive to vibration and shock than conventional batteries, vibration dampeners may be positioned within or surrounding a portion of the housing for absorbing vibration when the housing is within the battery receptacle tray and the vehicle is in operation. Preferably the apparatus is sized to fit within receptacle trays of standard dimensions for pallet truck, narrow aisle lift trucks, sit-down lift trucks and the like.

A method of converting an electric vehicle having a high peak power to average power ratio from electric power to hybrid power is also described. The method includes the steps of providing a hybrid power supply apparatus as described above; removing a conventional battery from the battery receptacle tray; positioning the housing of the hybrid power supply apparatus within the battery receptacle tray; and electrically connecting the power output of the hybrid power supply apparatus to the drive system of the vehicle.

The invention may also be employed in non-vehicular applications where a hybrid power supply is required for use in a relatively small, self-contained space. In the applicant's invention, the power output located on the apparatus housing is preferably the only interface between the apparatus and the load.

As should be apparent from the foregoing, it is an object of the invention to provide a high energy density hybrid power supply system that is optimized for operation within an enclosure space similar to traditional removable battery systems, with identical electrical DC output, and having extended operational time between refueling stops.

A further object of the invention is to provide precise thermal regulation of the power supply components and safe and ergonomic external interfaces for ease of operator use.

Still another object is to replicate the traditional battery physical characteristics, such as weight and enclosure size, so that the battery replacement procedure is transparent and safe for the vehicle operator. A related object is to reduce system vibrations to increase performance of the hybrid system.

Another object is to provide a specialized chamber within the apparatus housing for temperature-controlled fuel storage.

A further object is to allow for fuel tank resizing to effectively increase or decrease the range of the vehicle.

BRIEF DESCRIPTION OF DRAWINGS

In drawings which illustrate embodiments of the invention but which should not be construed as restricting the spirit or scope of the invention in any way.

DESCRIPTION OF INVENTION

Figure 1A:
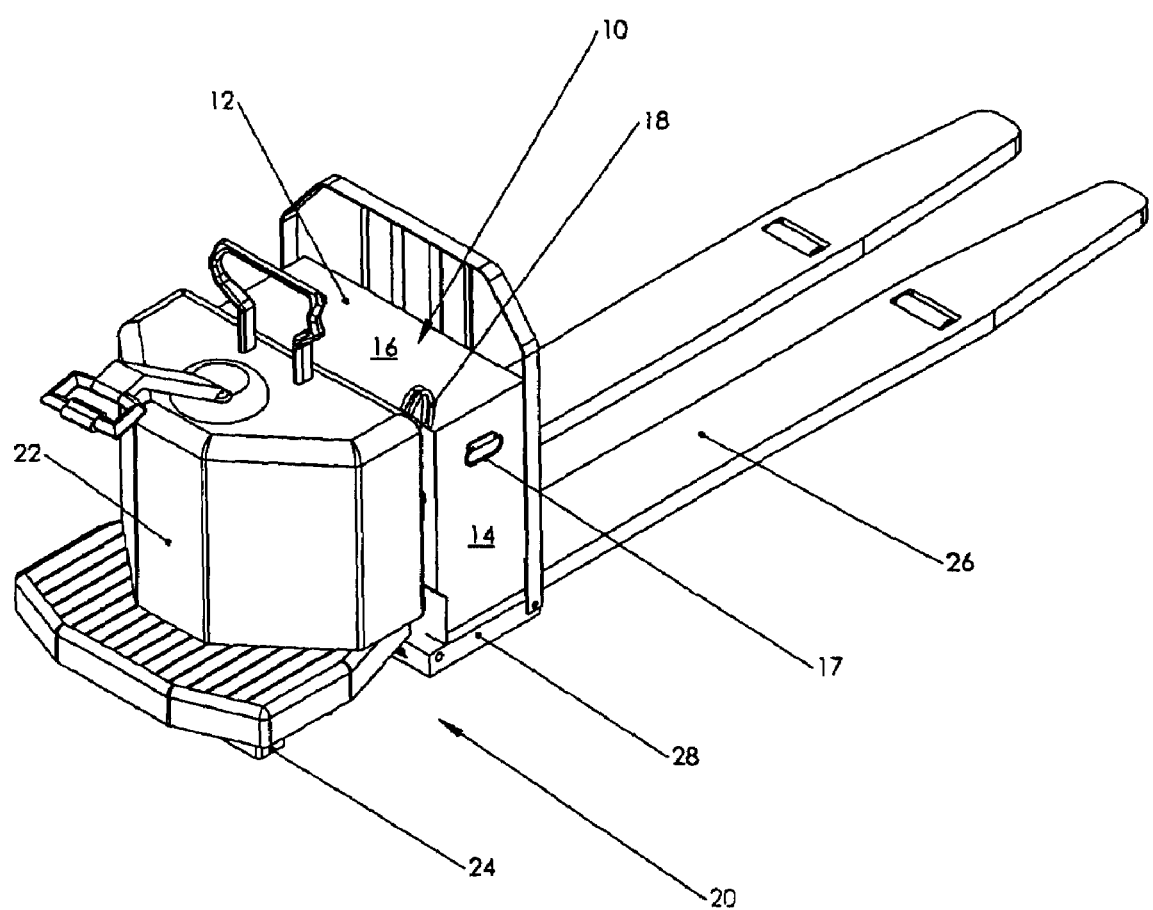
FIG. 1(a) is a rear isometric view of an electric lift truck showing a conventional prior art battery in its installed configuration.
Figure 1B:
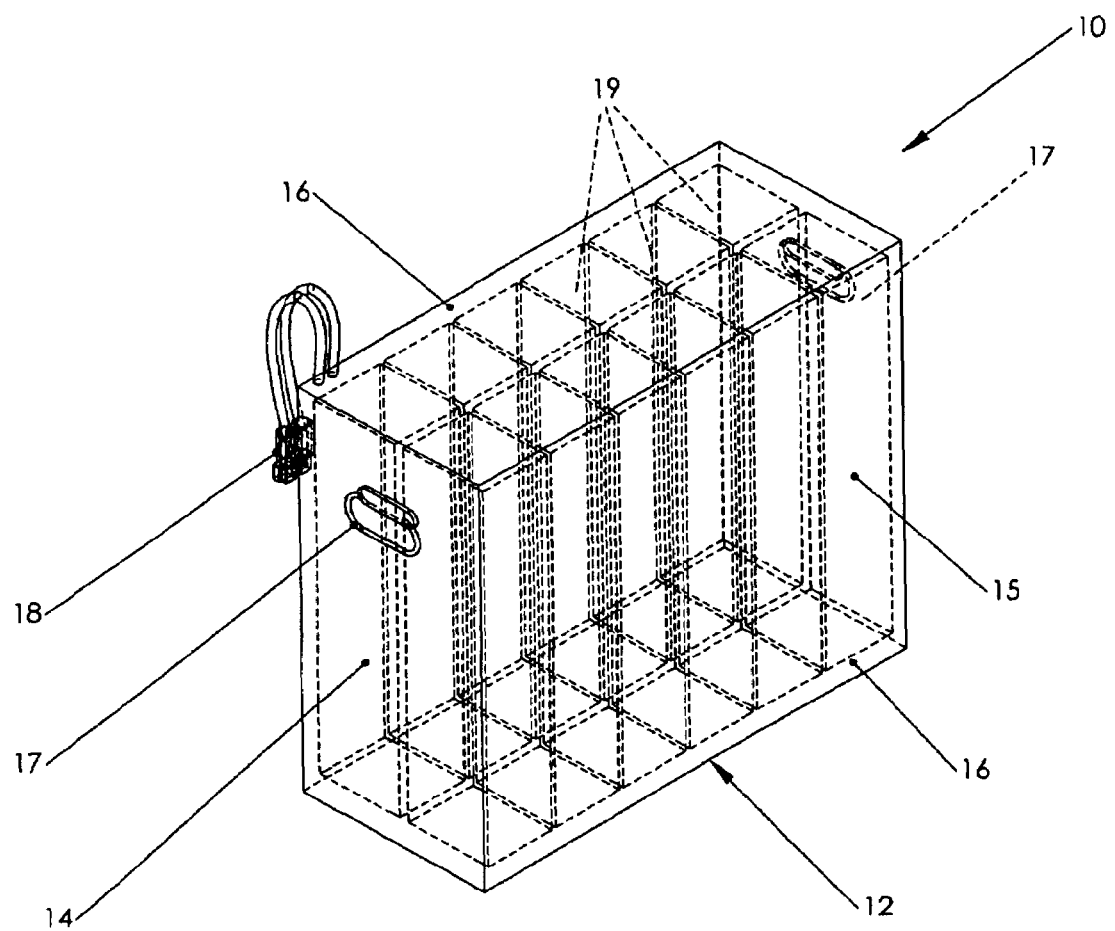
FIG. 1(b) is an enlarged isometric view of the conventional battery of FIG. 1(a).

A conventional industrial or "traction" battery 10 for a forklift truck 20 is shown in FIGS. 1(a) and 1(b). Battery 10 includes a box-shaped housing 12 having opposed end faces 14, side faces 15 and top and bottom faces 16. As shown in FIG. 1(a), truck 20 typically includes a main body 22 mounted on wheels 24 and having a fork lift mechanism 26 attached. The main body 22 has a cavity or battery receptacle tray 28 which is sized and shaped to removably receive one battery 10. In the example shown, tray 28 is rectangular in shape and is located in the center of the main vehicle body 22. However, the location and dimensions of tray 28 will vary depending on the specific truck manufacturer, model and application. By way of example, pallet trucks have maximum allowable battery tray dimensions of 31"L×13"W×32"H (the height is variable depending upon the battery capacity). Narrow aisle lift trucks vary to a greater extent, but a typical battery tray 28, for a 36 volt DC model, is 38"L×20"W×31"H. A sit-down fork lift truck also has several variations, but a typical battery tray 28, for a 36 or 48 volt DC model, is 38"L×32"W×22"H.

Battery 10 is enclosed to a greater or lesser extent depending on the location of battery tray 28 in truck 20. In the example shown in FIG. 1(a), end faces 14 and a top face 16 are exposed. In other common configurations only one end face 14 of housing 12 is exposed, the remainder being enclosed by the main truck body 22. Since battery 10 is extremely heavy (approximately 900 pounds in some applications), the battery charging station and/or vehicle 20 may include a transport system (not shown) consisting of rollers and guides for ease of sliding the battery 10 in and out of tray 28. The lift truck 20 or other vehicle may also include standard mechanical retainers (not shown) to lock the battery 10 in place within tray 28 for safety during operation.

The structure of conventional traction battery 10 is shown in greater detail in FIG. 1(b). Battery housing 12 is typically constructed from steel and includes a pair of lifting handles 17 mounted on opposed end faces 14. A DC cable and plug interface 18 extends from housing 12 and is connected to the electrical drive system (not shown) of truck 20. Plug interface 18 is standard for most electric vehicles. A plurality of battery cells 19 are mounted within battery housing 12 as shown and are electrically connected to the DC output plug interface 18. Battery 10 is typically of the lead acid type. When battery 10 requires recharging, it is usually manually rolled off truck 20 to a recharging station (not shown), a charged replacement battery 10 is rolled into tray 28, and the DC output plug 18 of the replacement battery 10 is connected to the electrical drive system of truck 20. Depending upon the application, conventional batteries 10 have operating times as low as 4–5 hours and therefore require frequent recharging. As discussed above, the frequent daily removal of discharged batteries and substitution of fully charged batteries is labour-intensive and requires a costly inventory of spare batteries. Of course, battery charging stations and associated instrumentation must also be provided.

Figure 2:
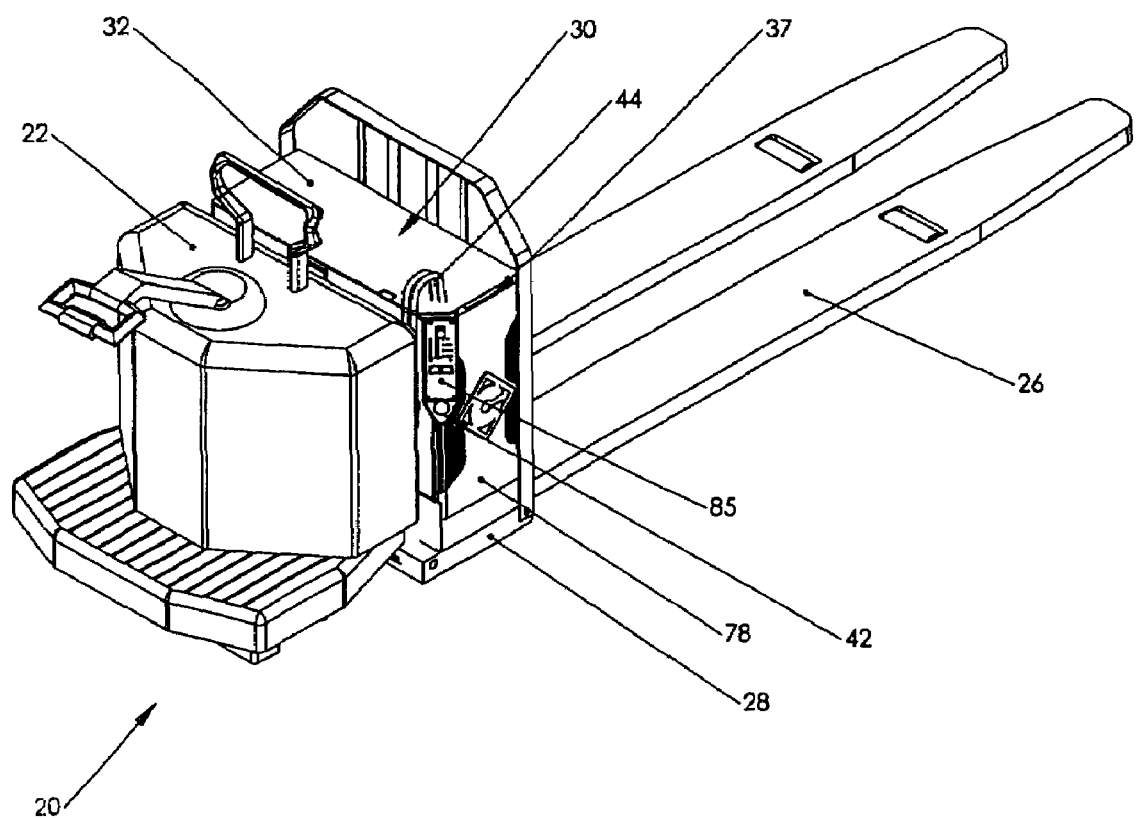
FIG. 2 is a rear isometric view of the truck of FIG. 1 fitted with the applicant's hybrid power supply apparatus.

The hybrid power supply apparatus 30 of the present invention is illustrated in its installed configuration on a truck 20 in FIG. 2. As discussed further below, apparatus 30 is "hybrid" in character since it includes both a fuel cell to generate electrical power and an energy storage means, such a storage battery, which is connectable to a load. Apparatus 30 has been engineered so that it is transparently interchangeable with a conventional battery 10 in a "plug and play" manner without requiring any modification to truck 20. More particularly, apparatus 30 has substantially the same shape, dimensions, weight and electrical interface as a battery 10 of FIGS. 1(a) and (b). This enables apparatus 30 to be easily inserted into or removed from an existing battery tray 28 and used in the same manner as a conventional battery 10. However, apparatus 30 has performance characteristics, including an effective operating time, which are far superior to a conventional battery 10. By way of example, prototype apparatuses 30 tested by the inventors have provided an order of magnitude greater operating time before requiring refueling/recharging (i.e. up to 50 hours compared to 4–8 hours for conventional batteries 10).

While hybrid fuel cell/battery power systems are of course well known in the prior art, the integration of such a system within a small geometric space (i.e. an enclosure capable of fitting within the dimensions of a standard battery tray 28) poses multiple design challenges. As described in detail below, the various fuel cell hybrid components must be efficiently arranged within a small enclosure while maintaining weight characteristics and a DC interface similar or identical to conventional battery systems 10. Further, the placement of air inlets and outlets is important to avoid adding heat to truck 20 and for optimum internal thermal management. Accessibility of fuel inlets is similarly important to ensure ease of refueling by operators.

Further, trucks 20 are designed for holding traction batteries 10 which are very robust and insensitive to many environmental conditions. Fuel cell hybrid systems, by contrast, are much more sensitive to temperature, vibration, shock, debris, moisture and the like and hence the applicant's invention has been engineered to address such environmental factors, as discussed further below.

Figure 3:
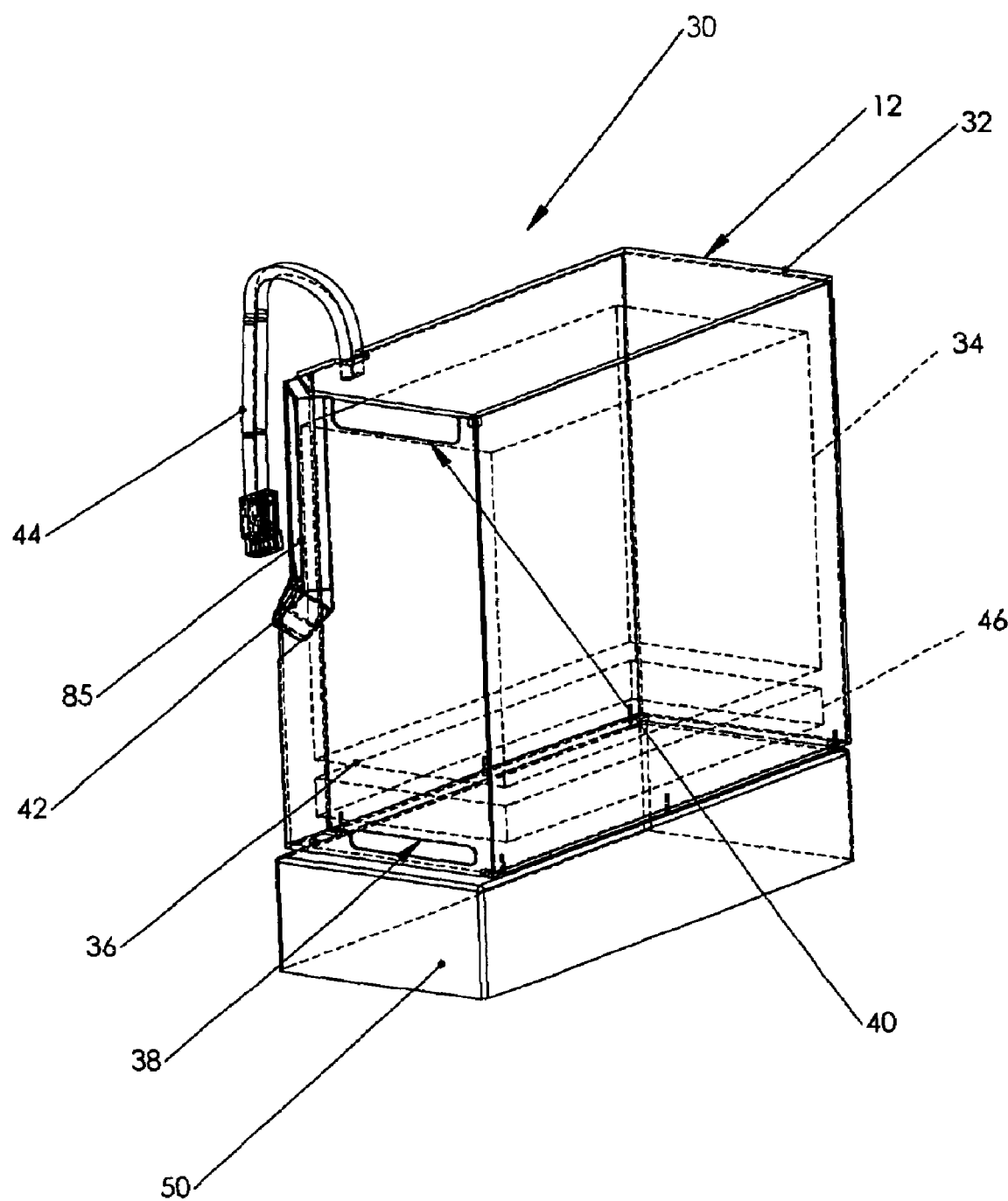
FIG. 3 is an isometric view showing the general layout of the applicant's hybrid power supply apparatus.
Figure 4:
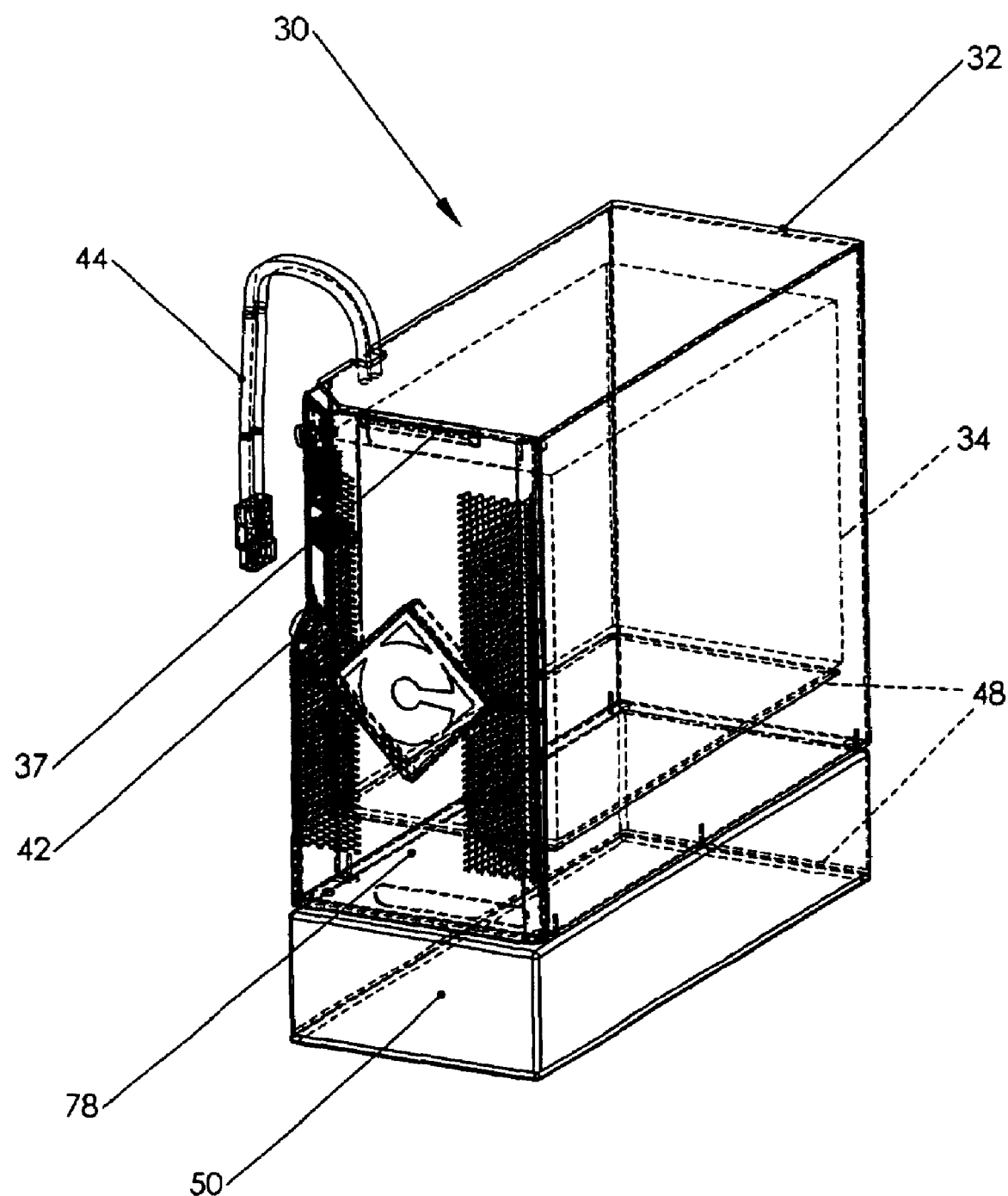
FIG. 4 is an isometric view of an alternative embodiment of the apparatus of FIG. 3 including weight counterbalancing and vibration damping features.

The general layout of the applicant's hybrid power supply apparatus 30 is illustrated in FIG. 3. Apparatus 30 includes an external housing 32 which encloses a hybrid power subsystem generally designated 34. The various component parts and features of subsystem 34 are described in detail below. Housing 32 further includes an exposed end panel 36 which is accessible when apparatus 30 is in use (i.e. corresponding to the exposed end face 14 of a conventional battery 10). Subsystem 34 is preferably air-cooled. In the illustrated embodiment, an air inlet 38 and an exhaust outlet 40 are located on housing panel 36. As discussed further below, hybrid apparatus 30 is configured to ensure that the temperature of housing 32, and the exhaust expelled from outlet 40, is kept within safe limits to avoid operator injury. As shown in FIG. 4, air inlet 38 and outlet 40 may optionally be covered by a conventional grill or deflector shield 78 to filter debris and ensure the exhaust gas stream is ergonomically located for operator comfort.

A fuel inlet 42 is also provided on housing panel 36 for delivering fuel from a fuel source to hybrid power subsystem 34. In the illustrated embodiment, fuel inlet 42 is connectable to a fuel storage chamber 50 located within housing 32. In use, fuel is delivered from storage chamber 50 to subsystem 34 to generate electrical power which is delivered to a power output 44 connectable to a load, such as the drive system of a lift truck 20.

The housing 32 of FIGS. 2–5 is box-shaped to fit within the space constraints of a conventional battery tray 28 However, as will be apparent to a person skilled in the art, housing 32 could be any geometric shape provided that it is safely compatible with tray 28 and is ergonomically connectable to the vehicle electric drive system. For example, the electrical interfaces of power output 44 could be exposed at different locations to ergonomically mate with the electrical sub-system of the particular vehicle (or other load device) in question.

As mentioned above, the weight characteristics of applicant's apparatus 30 preferably simulate a conventional battery 10 to avoid the need for vehicle modification. Hybrid power subsystem 34 is much lighter than standard lead acid batteries. Accordingly, for apparatus 30 to have a mass similar to existing batteries 10, mass must be added. Such added mass is essential as the counterbalance of many vehicles 20 is designed for the heavy lead acid battery mass. As shown generally in FIG. 3, apparatus 30 may include a weight counterbalance 46 located within housing 32. As will be understood to a person skilled in the art, weights could alternatively be selectively added at various different void locations within housing 32 to optimize counterbalance requirements based on the mass distribution of the hybrid power subsystem 34 and fuel storage configurations. Housing 32 may also include a handle 37 for ease of transport (FIG. 4).

As mentioned above, hybrid power subsystem 34 is more sensitive to vibration and shock than conventional batteries 10. Accordingly, apparatus 30 also preferably includes vibration damping material 48 located within housing 32. As shown in FIG. 4, damping material 48 may be located, for example, immediately underneath hybrid power subsystem 34 and underneath fuel storage chamber 50 in a lower portion of housing 32. Closed cell foam or elastomeric materials such as sorbothane are examples of suitable damping materials. Another possible embodiment includes damping material specifically tuned to reduce coupling of specific vehicle vibrations and specific resonant frequencies of apparatus 30 and enclosed subsystems. A further damping embodiment may incorporate shock absorbing mechanical connectors, as known in the art for use in vehicles, for internal mounting isolation of the hybrid power subsystem 34. In yet another embodiment an external damping layer may be provided positionable within receptacle tray 28 for supporting or attachment to housing 32. Preferably such an external damping layer should be constructed from a material that it is suitably rugged to withstand insertion and removal friction (for example, damping materials having a high sheer strength).

Figure 5:
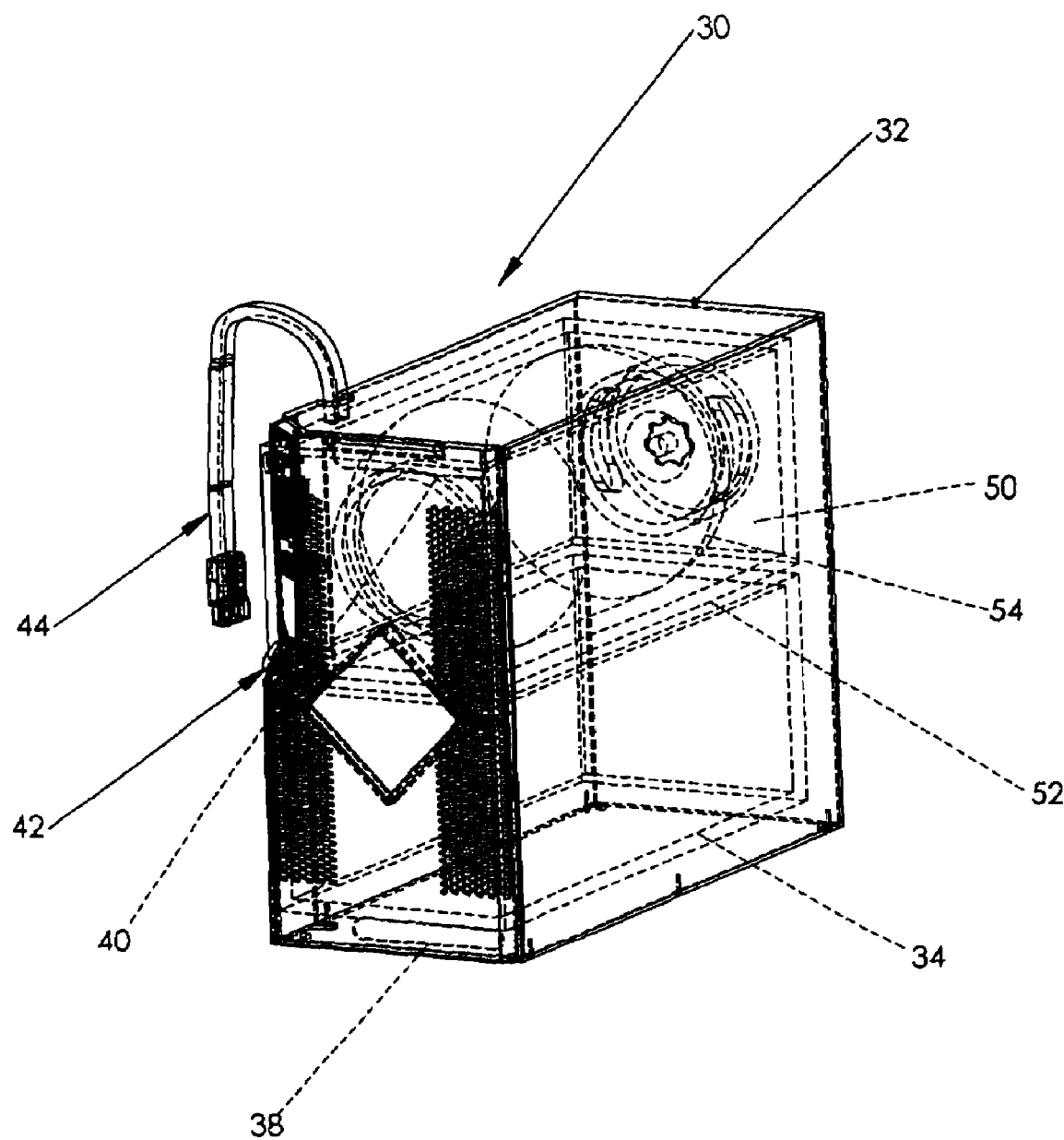
FIG. 5 is an isometric view showing the general layout of an alternative embodiment of applicant's hybrid power generating apparatus including an internally sealed temperature controlled fuel storage chamber.

Hybrid power subsystem 34 may utilize various different types of liquid, compressed gas and hydride fuels. Suitable fuels include pure or enriched hydrogen gas, metal hydride, methanol, natural gas and propane (LPG). FIG. 5 illustrates the general layout of one embodiment of the invention wherein the fuel storage chamber 50 is thermally isolated from the remainder of housing 32 by a baffle 52. In this embodiment, chamber 50 would be suitable for holding a fuel source which should be maintained at a particular temperature and pressure for optimum performance (for example, LPG stored within a secured container 54).

Figure 6:
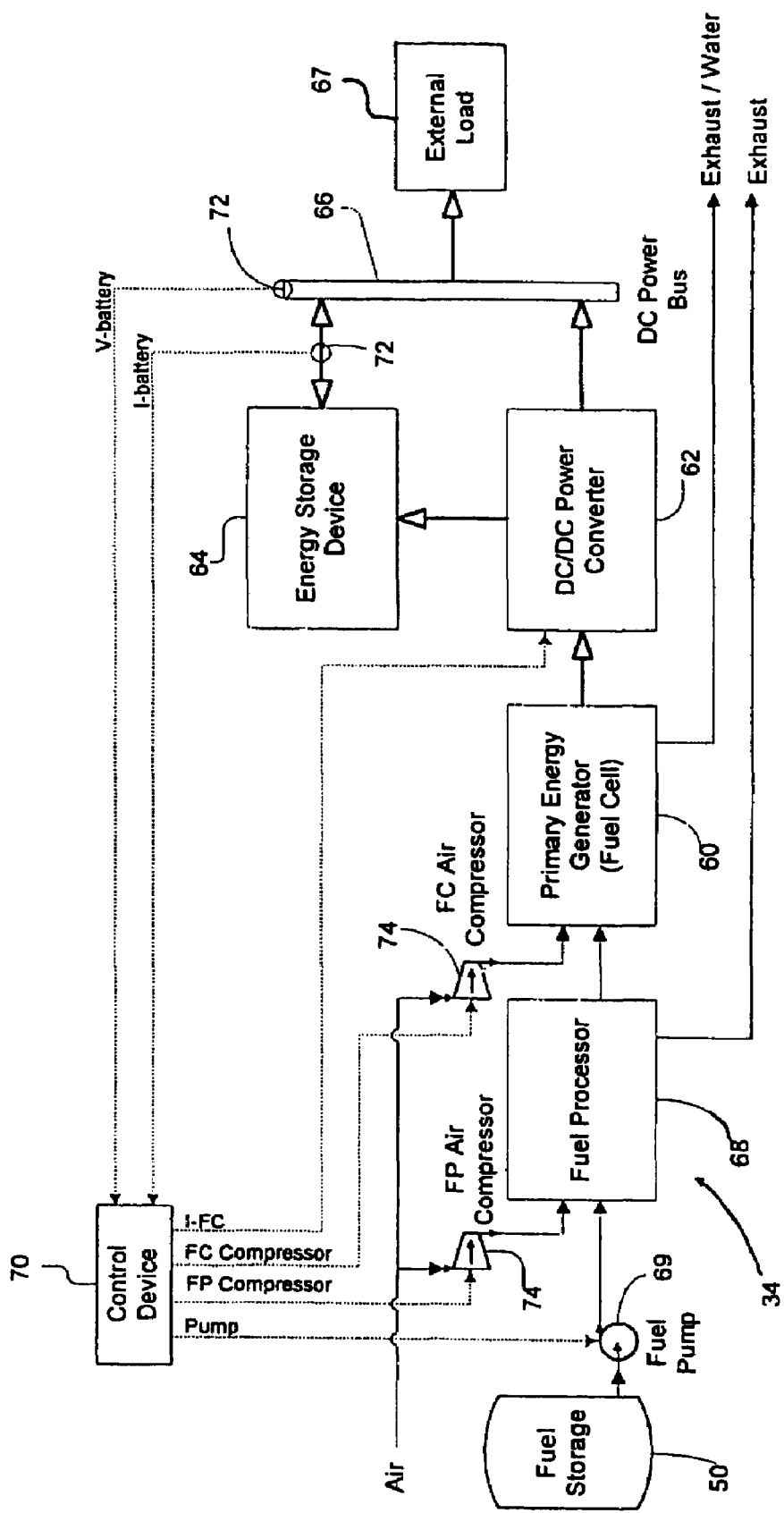
FIG. 6 is a schematic diagram showing the hybrid fuel cell/battery architecture and charging characteristics of the applicant's system.

FIG. 6 illustrates schematically the architecture of the hybrid power subsystem 34 of apparatus 30 in further detail. Subsystem 34 includes a fuel cell 60 which delivers raw DC current to a DC/DC converter 62. An energy storage device 64 is connected to the DC/DC converter 62 for storing at least part of the conditioned DC current outputted by converter 62. Energy storage device 64 may comprise, for example, a battery, a capacitor, or a combination thereof. Energy storage device 64 is electrically coupled to a DC bus 66 for delivering electrical energy to a load 67, such as the drive system of a lift truck 20.

As explained above, hybrid power subsystem 34 may employ various types of fuels. In preferred embodiments subsystem 34 uses readily available fuels such as methanol and propane (LPG). In such cases, subsystem 34 includes a fuel processor, such as a reformer 68, for converting raw fuel to substantially pure hydrogen or hydrogen-enriched gas suitable for use by fuel cell 60. Reformer 68 is coupled to fuel storage chamber 50 with suitable fuel lines. A fuel pump 69 may be provided for delivering fuel from chamber 50 to reformer 68.

A computer controller 70 which receives input from various sensors, such as voltage and current sensors 72, controls charging of storage device 64 by fuel cell 60. As discussed further below, subsystem 34 also includes fan blowers 74 for circulating air through flow paths within housing 32 to maintain the temperature of each component of apparatus 30 within a preferred temperature range and to dilute exhaust gases prior to expulsion from housing 32. The operation of blowers 74 may also be regulated by controller 70.

As explained above, sudden load fluctuations are commonplace in lift trucks 20 and similar vehicles. Due to the slow response time of reformer 68, a fuel cell system alone cannot respond quickly to rapid changes in load and hence a hybrid system as exemplified by the applicant's invention is desirable for such applications. Hybrid power subsystem 34 is configured to maintain storage device 64 in a state of high residual capacity to cope with load surges. This enables "on demand" power to be supplied by storage device 64 while the power output of fuel cell 60 can be varied independently to replenish energy to storage device 64, or deliver power jointly to the load on an opportunistic basis. Moreover, the hybridization of subsystem 34 allows for the fuel cell 60 and reformer 68 components to be sized to meet only the average power requirements of the application (rather than the peak power requirements). In the case of the duty cycle of an electric lift truck 20, with characteristic peak power to average power ratios of approximately 10:1, this results in a significant reduction in the quantity of the higher priced fuel cell components of the system.

In use, hybrid power subsystem 34 is preferably configured so that sensors 72 continuously monitor the state of charge and/or the voltage of storage device 64. When hybrid power apparatus 30 is subjected to a load, the state of charge of storage device 64 decreases as detected by sensors 72. In one embodiment of the invention, this information is processed by controller 70 which returns a feedback signal to fuel cell 60 resulting in an increase in the fuel cell output charge current. In a preferred embodiment of the invention fuel cell 60 is not operated in a load-following mode. Rather, changes in the fuel cell charge current are minimized so that fuel cell 60 operates under near steady state conditions for the bulk of its charging time to prolong its useful service life. This may be achieved by programming controller 70 to step up or step down the fuel cell output charge only at discrete intervals depending upon the state of charge of storage device 64.

One representative embodiment of the applicant's hybrid power apparatus 30 utilizing methanol fuel is illustrated in FIGS. 7–10. In this embodiment, hybrid power apparatus 30 is illustrated with a top panel of housing 32 removed for clarity. Housing 32 also includes an end panel 80 located opposite the end panel 36 having the user interfaces and a pair of side panels 82 and 84 which are pivotable between open and closed positions (in FIGS. 7 and 10 side panels 82, 84 are shown in the open position to expose the various components arranged within housing 32).

In the embodiment of FIGS. 7–10, fuel chamber 50 for storing methanol fuel is located in a bottom compartment of apparatus 30. Fuel inlet 42 is located on exposed end panel 36 for supplying fuel to fuel chamber 50. Storage device 64, such as a conventional battery, is positioned above fuel chamber 50 proximate air inlet 38 (as shown best in FIG. 10). DC/DC power converter 62 is positioned adjacent storage device 64 in a central portion of housing 32. Fuel cell 60 is positioned in an upper portion of housing 32 above storage device 64. Controller 70 is located adjacent fuel cell 60 at a location above DC/DC power converter 62. As shown best in FIG. 10, power output 44 is coupled to DC bus 66 which is operatively coupled to controller 70. A user control panel 85 is provided on end panel 36 above fuel inlet 42 for monitoring and controlling operation of apparatus 30. For example, panel 85 may include a start/stop control button and a fuel level indicator.

Figure 7:
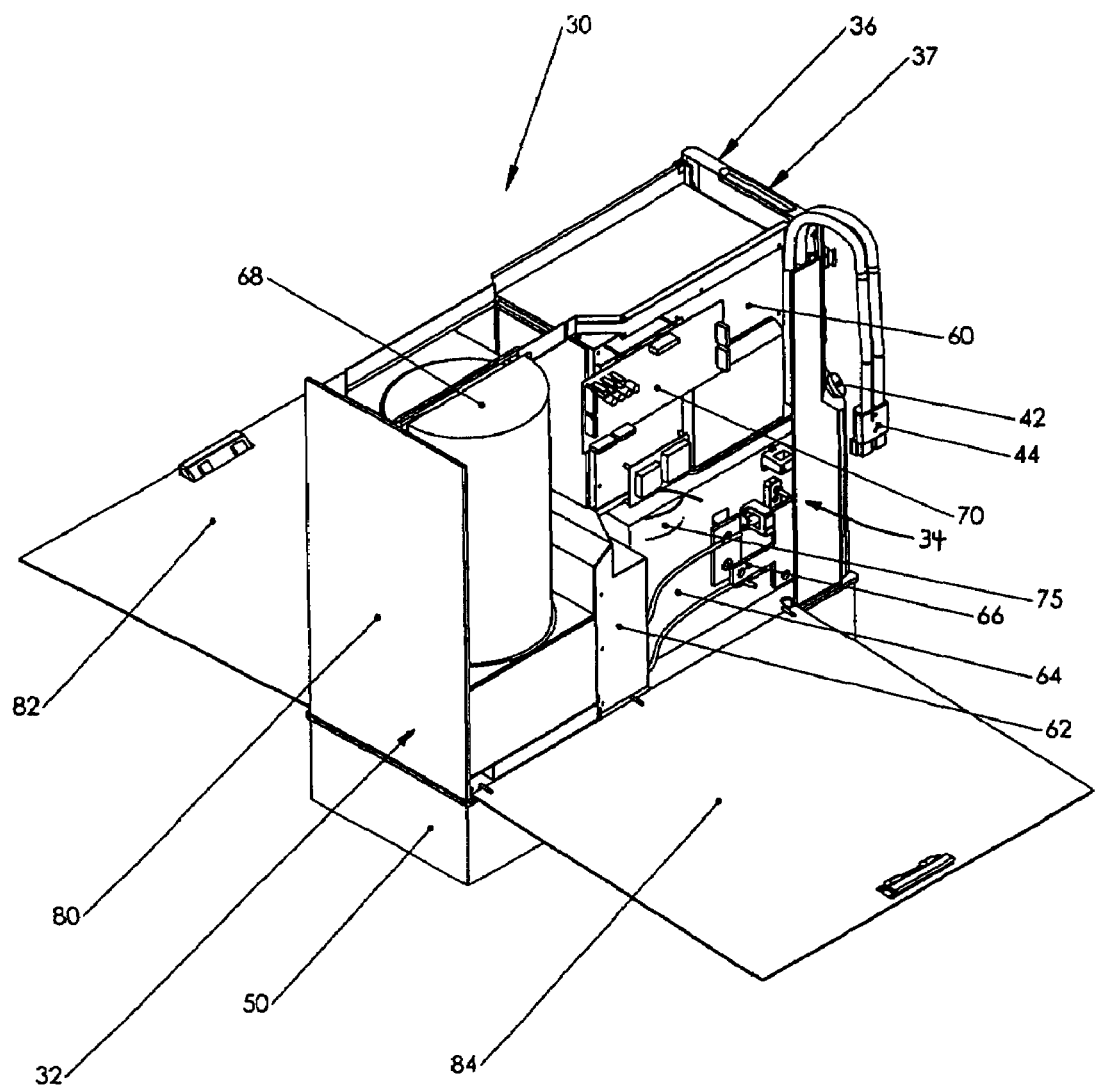
FIG. 7 is an isometric view of one particular embodiment of the applicant's hybrid power supply apparatus using liquid fuel and showing side panels of the apparatus housing in an open position to expose internal components.
Figure 8:
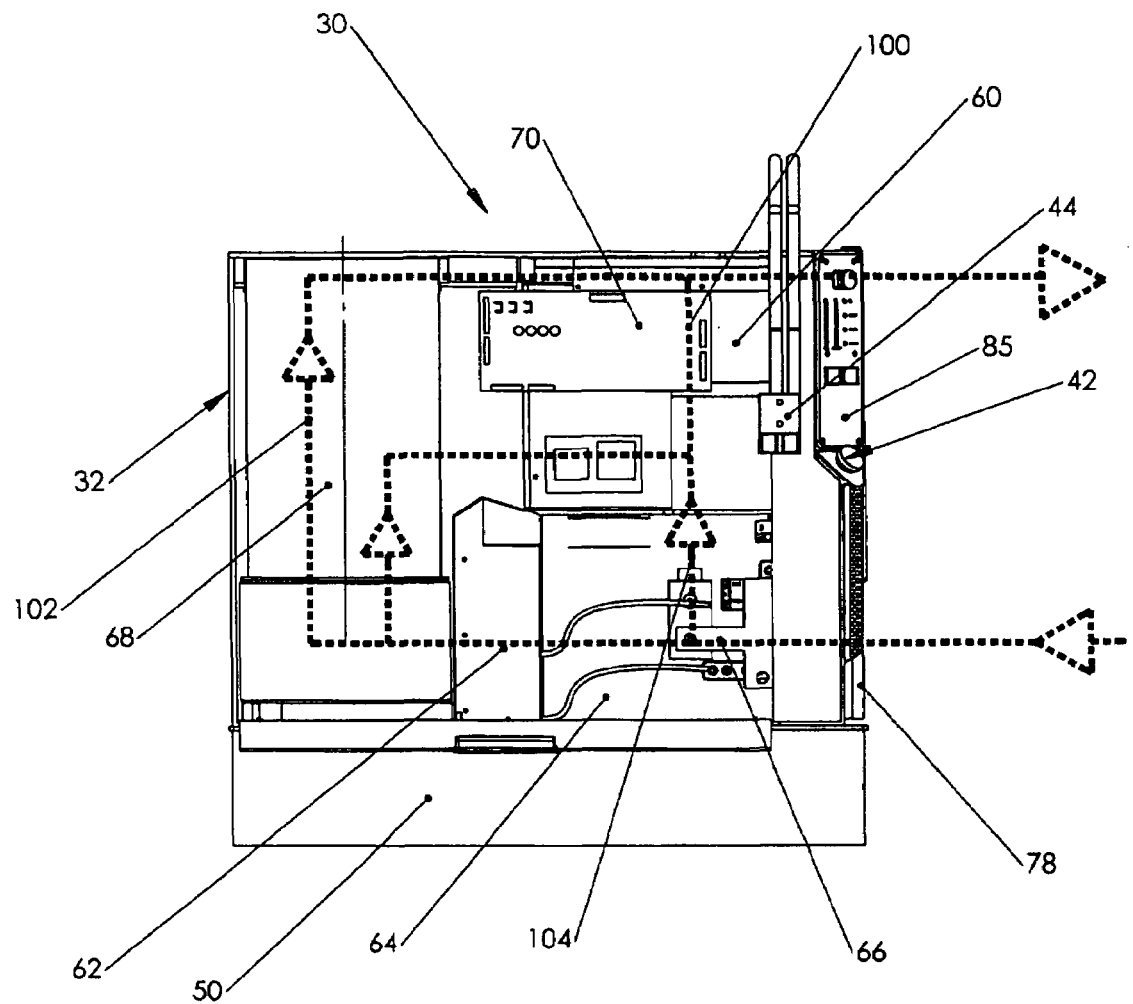
FIG. 8 is a side elevational view of the embodiment of FIG. 7 with a side panel removed and showing exemplary air flow paths in dotted outline.
Figure 9:
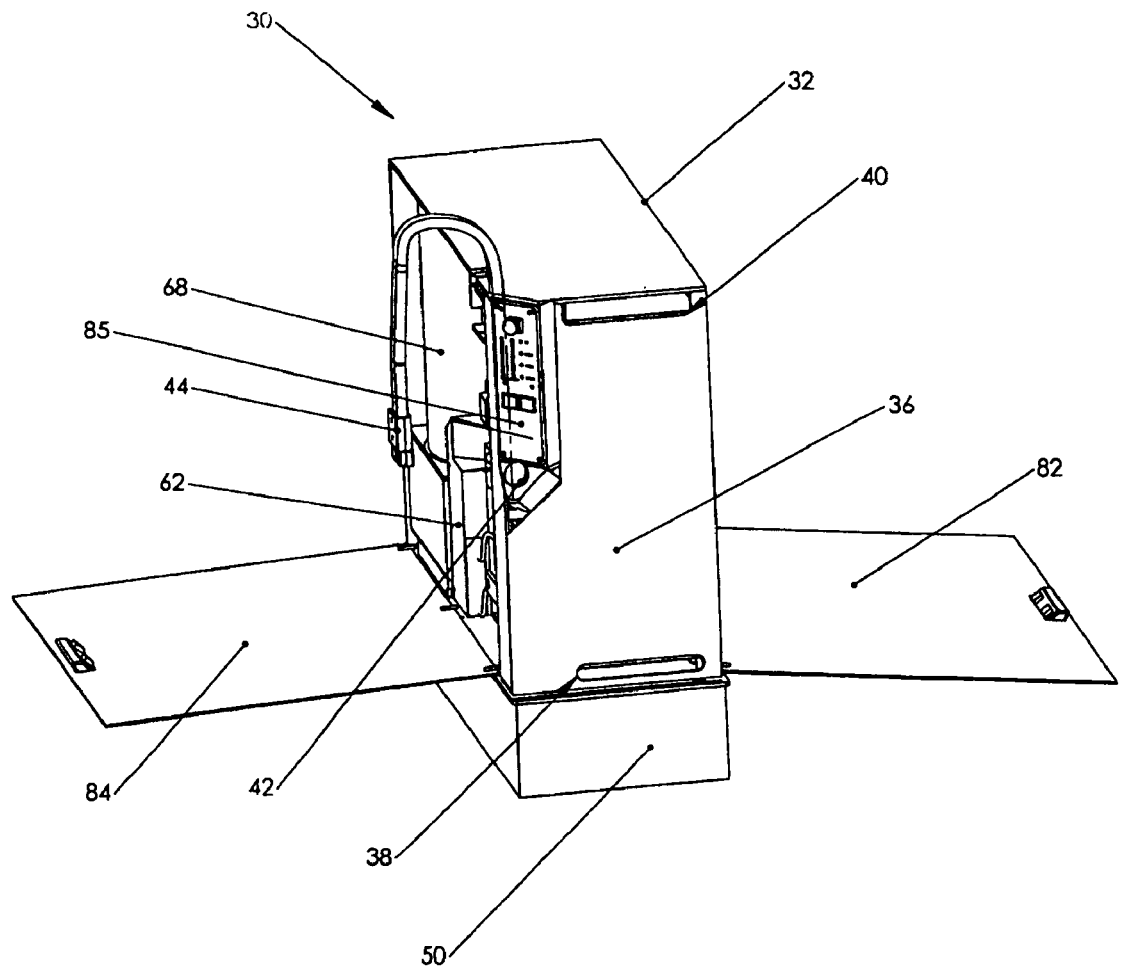
FIG. 9 is an end isometric view of the embodiment of FIG. 7 showing the user interface which is exposed in use.
Figure 10:
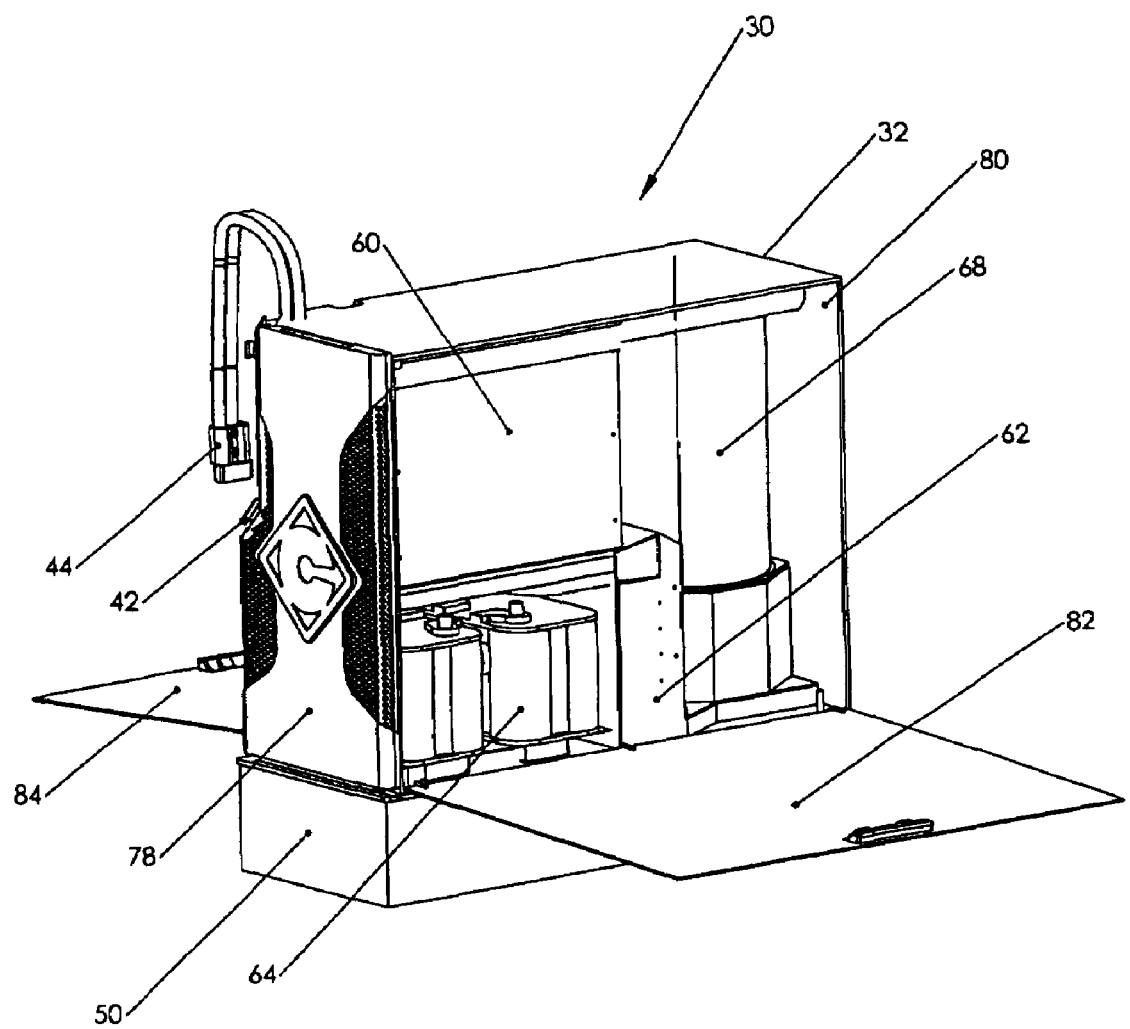
FIG. 10 is a further isometric view of the embodiment of FIG. 7 showing the side panels of the housing in a open position to expose internal components.

The portion of housing 32 proximate end panel 80 is occupied principally by reformer 68 which is connected by fuel line(s) to the underlying fuel storage chamber 50 (FIG. 7). Reformer 68 may be housed within a shroud (not shown) to help dissipate radiant heat from reformer 68.

Figure 11:
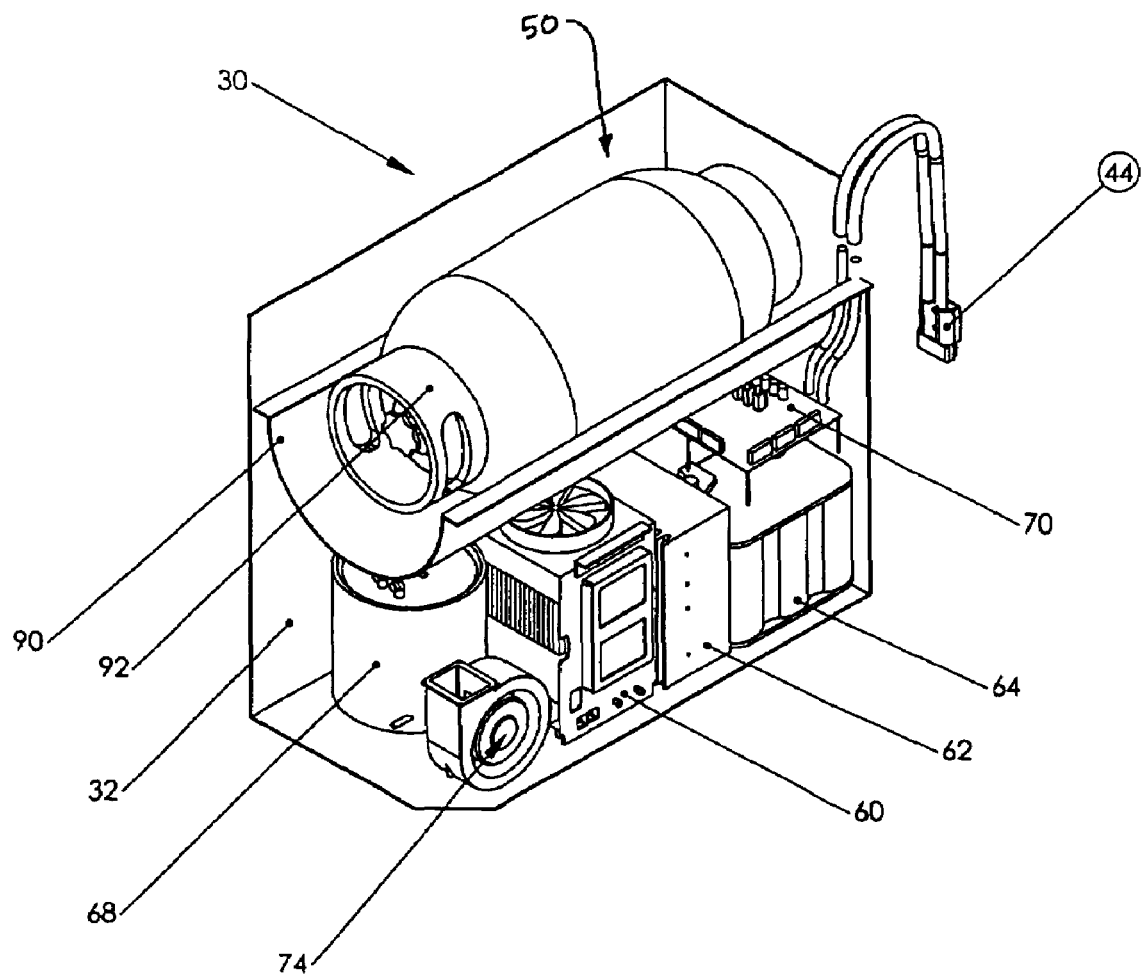
FIG. 11 is an isometric view of an alternative embodiment of the invention suitable for using compressed gas fuel.

FIG. 11 illustrates another possible embodiment of the applicant's hybrid power supply apparatus 30 employing a compressed gas fuel (e.g. LPG) rather than liquid fuel. This embodiment of the invention is generally similar in layout to the embodiment of FIGS. 7–10, except that fuel storage chamber 50 is located in an upper region of housing 32 and is thermally and hermetically isolated from the remainder of housing 32 by means of wall 90. This enables the temperature and pressure conditions of chamber 50 to be modulated independently of the remainder of housing 32 to suit the requirements of the fuel source. Chamber 50 is sized to receive a compressed gas tank 92 which may be either refillable or replaceable depending upon the choice of fuel. An access door having a self-sealing hinge (not shown) may be provided for gaining access to chamber 50 to enable easy removal and replacement or examination of tank 92. Alternatively, in the case of refillable tanks 92, a fuel inlet port (not shown) in fluid communication with tank 92 may be provided. As will be apparent to a person skilled in the art, the size of fuel tank 92 could easily be varied to effectively increase or decrease the range of vehicle 20.

Sealed chamber 50 preferably includes a thermal sensor (not shown) and heating unit (not shown) connected to controller 70. The chamber temperature can thus be monitored and corrected for maintenance of a minimum temperature suitable for optimum operation of hybrid power subsystem 34. The use of a sealed fuel storage chamber 50 also results in better regulation of fuel pressure and superior operation of apparatus 30 in refrigerated environments. Further, a sealed chamber 50 has the additional benefit of maintaining the cleanliness of hybrid power subsystem 34 which is located in a separate portion of housing 32 and is not exposed to the environment when the chamber access door is opened for refueling etc.

In the embodiment of FIG. 11 fuel cell 60 is positioned immediately adjacent reformer 68 in a lower portion of housing 32 and controller 70 is positioned above energy storage device 64 proximate housing surface 36. Notwithstanding the different internal configuration, the embodiment of 11 functions in a manner similar to the embodiment of FIGS. 7–10 described above. Other equivalent configurations could envisioned by a person skilled in the art without departing from the invention.

As mentioned above, apparatus 30 is preferably air-cooled and includes blowers 74 for directing air flow within housing 32 (FIGS. 6 and 11). The various components of apparatus 30 are geometrically ordered relative to air flow paths based on temperature limits and sensitivity. Preferably the coolant air is reused as much as possible to minimize total air flow. Since apparatus 30 is designed for low power applications, it is important to minimize flow impedances and electrical parasitic loads associated with the cooling system.

Optimum thermal regulation of hybrid power apparatus 30 is important for several reasons. Fuel cell systems, particularly those with associated fuel processors, generate significant waste heat. In many cases hybrid power systems are operated outdoors or in applications having a fixed outdoor exhaust (e.g. automobiles or home power systems). However, lift trucks 20 and the like, which are often operated indoors, are constrained to emit low temperature exhaust only. More particularly, it is important that the external surfaces of hybrid power apparatus 30, such as the exposed end panel 36 of housing 32, be maintained at a low temperature to avoid operator injury. Further, it is equally important that a significant amount of heat not be transferred from apparatus 30 to the body 22 of truck 20 (i.e. all excess heat should preferably be transferred to the environment rather than placing additional thermal loads on associated equipment, such as truck 20). Optimum thermal regulation also enables hybrid power apparatus 30 to be used in a wide range of ambient temperatures typically serviced by trucks 20, including sub-freezing refrigerated environments as would be encountered in freezer lockers and the like.

Figure 12:
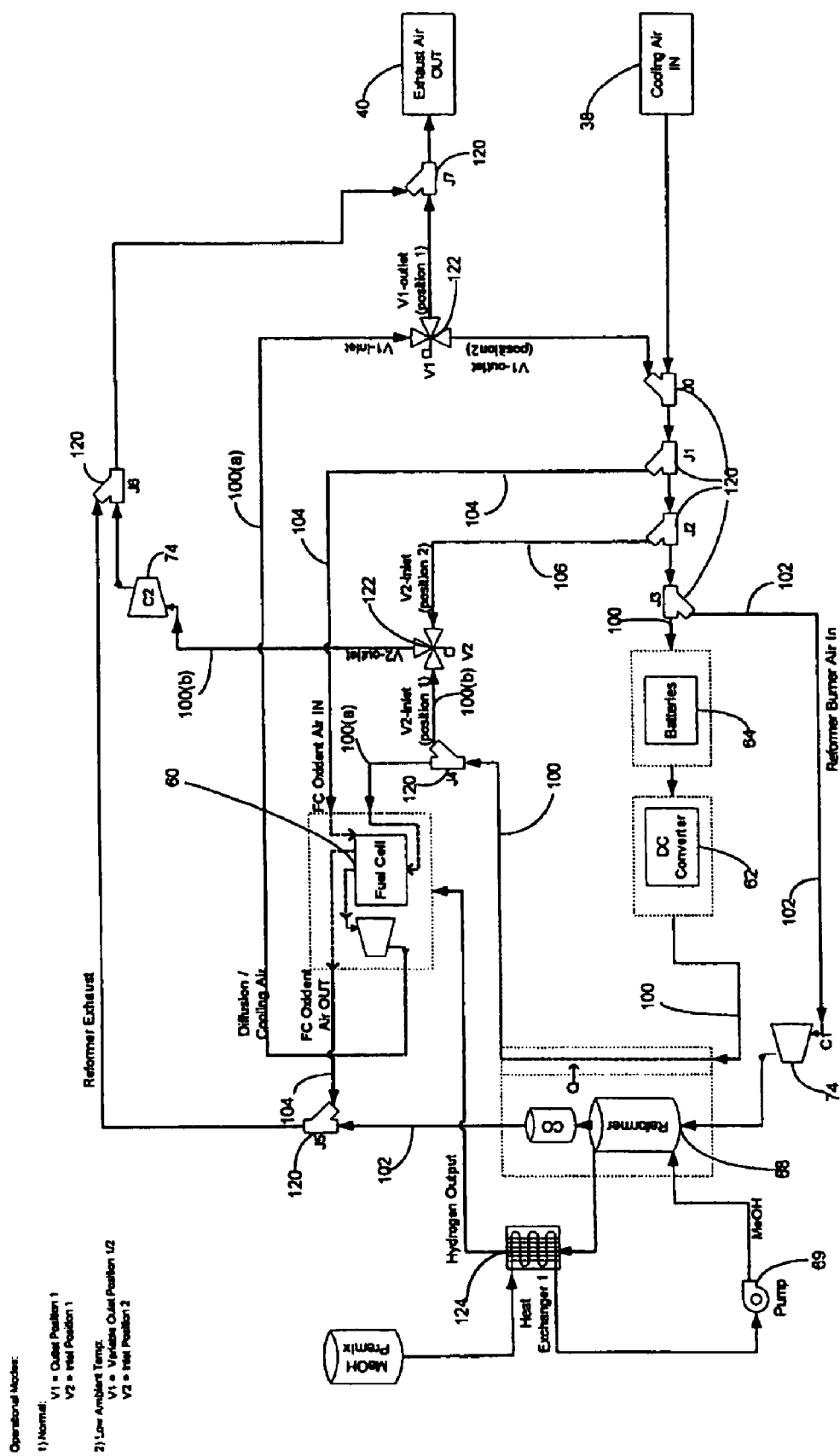
FIG. 12 is a schematic drawing of one possible arrangement for air cooling of the applicant's hybrid power supply apparatus.

One particular arrangement for thermal management of apparatus 30 is illustrated generally in FIG. 7 and schematically in FIG. 12. A heat transfer gas, such as air, is circulated through apparatus 30 to maintain the various components of hybrid power subsystem 34 within their optimum temperature ranges. The air is preferably moved through different flow paths between air inlet 38 and outlet 40. As shown in FIG. 12, a plurality of junctions 120 and adjustable valves 122 are preferably provided for strategically dividing and merging the air streams. In a normal operational mode (i.e. at normal ambient temperatures) the incoming air passing through inlet 38 is divided into three separate substreams 100, 102 and 104 at junctions 120. A first substream 100 is initially passed over storage device 64 and DC/DC power converter 62. Both of the above components are sensitive to temperature fluctuations and should be maintained at relatively cool operating temperatures for best performance. In the case of low ambient temperatures, at least some of the inlet air may be pre-heated with heated exhaust air as discussed further below to protect storage device 64 and converter 62 from excessively cold temperatures.

After passing over converter 62, the first substream 100 is diverted through a shroud surrounding reformer 68 to accept waste heat generated by the reforming process. Reformers 68 typically operate at very high temperatures (i.e. on the order of 600° C.). A first portion 100($a$) of substream 100 is then diverted to fuel cell 60 to maintain fuel cell 60 at a desirable operating temperature (i.e. within the range of approximately 60–80° C.). A second portion 100($b$) of substream 100 bypasses fuel cell 60 and is used to dilute the exhaust stream as described further below.

As illustrated in FIG. 12, the second and third substreams 102, 104 of the inlet air may be circulated directly to reformer 68 and fuel cell 60 respectively. Second substream 102 is exhausted from reformer 68 at a high temperature and is merged with substream 104 at a junction 120 located downstream from reformer 68. Substream 104 delivers oxident air to fuel cell 60 and contains water when expelled from fuel cell 60. The hot air present in substream 102 evaporates the water content of substream 104 and maintains the merged exhaust airstream in a vapour state suitable for expulsion to the environment.

As shown in FIG. 12, a heat exchanger 124 is preferably provided to cool the hydrogen gas generated by reformer 68 to ambient or near-ambient temperature and to pre-heat the methanol fuel before the fuel is pumped to reformer 68.

In the normal operational mode of the applicant's air cooling system, first portion 100($a$) and second portion 100($b$) of substream 100 are combined with the exhaust stream (resulting from mixing of substreams 102 and 104) at locations downstream from reformer 68. Portion 100($b$), which is relatively cooler than portion 100($a$) since it has not passed through fuel cell 60, reduces the temperature of the exhaust stream to a safe temperature (e.g. below 50° C.) before it is discharged through outlet 40. Substreams 100($a$) and 100($b$) also serve to dilute the carbon monoxide content present in the exhaust stream prior to its expulsion to the environment.

In an alternative operating mode suitable for low temperature operation, the first substream 100 is not divided into first and second portions 100($a$) and 100($b$) (i.e. all of substream 100 passes through fuel cell 60). In this embodiment, substream 100 may be subdivided downstream from fuel cell 60 at an adjustable valve 122. A portion of substream 100 may be recycled to pre-heat the incoming air drawn through outlet 38. In this case the inlet air may be divided into a further substream 106 for merging with the reformer exhaust (FIG. 12). An important feature of this arrangement is that the recycled portion of the heated air does not contain any reformer exhaust gases.

The exemplary air flow patterns described above are preferably under the control of microprocessor controller 70 which receives input from various temperature and air flow sensors (not shown). In one embodiment of the invention, controller 70 may be programmed to periodically reverse the direction of air flow. This enables the periodic expulsion of built-up debris from the interior of housing 32 through air inlet 38. As indicated above, air inlet 38 and outlet 40 may also include conventional grills or deflector shields 78 (FIG. 4) to filter debris and ensure the exhaust gas stream is ergonomically located for operator comfort.

As will be apparent to a person skilled in the art, other equivalent means for flowing cooling gas streams through housing 32 may be envisaged for the purposes of:

(1) Maintaining exhaust streams and operator interfaces at safe temperatures and preventing transfer of thermal loads to other equipment.
(2) Maintaining various components of the hybrid power subsystem within a preferred temperature range for optimum performance and longevity.
(3) Controlling the thermal status of different component parts precisely and independently.
(4) Enabling operation of electric vehicles at a wide range of ambient temperatures
(5) Dilution of exhaust gas constituents, such as carbon monoxide
(6) Purging of waste materials
(7) Minimizing parasitic electrical loads associated with the cooling system for improved performance.

Figure 13:
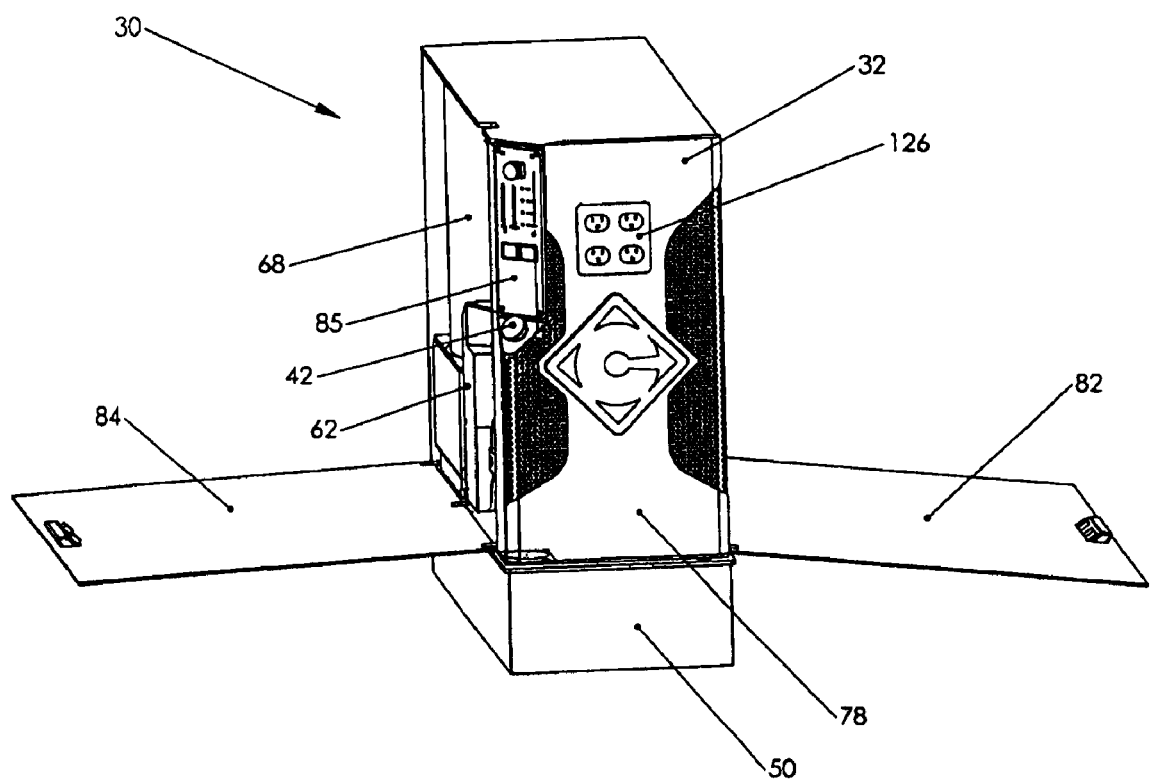
FIG. 13 is an isometric view of a further alternative embodiment of the invention similar to the embodiment of FIG. 7 but configured as a Genset.
Figure 14:
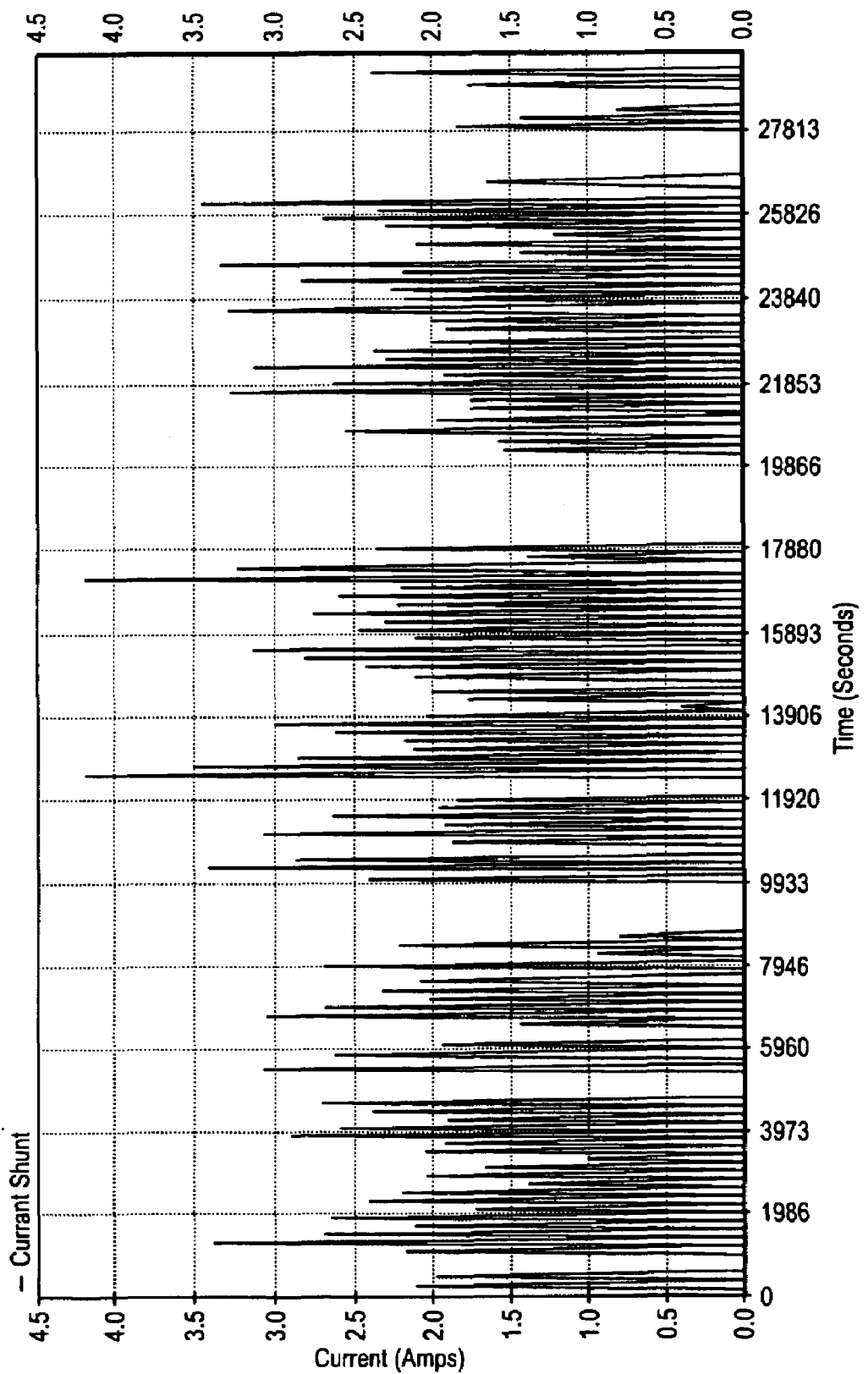
FIG. 14 is a graph of current v. time.

FIG. 13 illustrates a further alternative embodiment of the invention similar to the embodiment of FIGS. 7–10, but configured as a portable genset. In this embodiment, a standard AC electrical power outlet 126 is provided rather than DC power output 44.

As should be apparent to a person skilled in the art, hybrid power supply apparatus 30 is suitable for non-vehicular low power applications where the size of the power supply is limited by size or geometric constraints. For example, apparatus 30 may be used for on/off grid power generation, recreational power use, uninterruptible power supply and conventional battery replacement applications.

As will be apparent to those skilled in the art in the light of the foregoing disclosure, many alterations and modifications are possible in the practice of this invention without departing from the spirit or scope thereof. Accordingly, the scope of the invention is to be construed in accordance with the substance defined by the following claims.

What is claimed is:

1. A hybrid power supply apparatus interchangeable with a conventional battery removably positionable within a battery receptacle tray of an electric vehicle, the battery having a power output connectable to the drive system of the vehicle, said hybrid power apparatus comprising:
   (a) a fuel cell;
   (b) an energy storage device chargeable by said fuel cell;
   (c) a housing enclosing said fuel cell and said energy storage device, wherein said housing is sized to fit within said battery receptacle tray;

(d) a power output electrically connectable to said storage device and extending externally of said housing for electrically coupling said apparatus to said drive system of said vehicle when said housing is positioned within said battery receptacle tray;

(e) a first vibration dampener positioned within said housing for absorbing vibration when said vehicle is in operation;

(f) a second vibration dampener which surrounds at least part of said housing when said housing is positioned within said battery receptacle tray; and (g) a compensator weight positioned within said housing for increasing the weight of said apparatus to a weight approximating the weight of said conventional battery.

2. The apparatus of claim 1, where the compensator weight is positioned such that it is used to further absorb the vibration from the operation of said vehicle and the heat generated by said apparatus.

3. The apparatus in claim 1 further comprising a coolant system for flowing gas through said housing, said coolant system comprising:

(a) a gas inlet for drawing gas into said housing;

(b) at least one blower or fan positioned within said housing for moving gas through said housing in predetermined flow paths to regulate the temperature of said apparatus; and (c) a gas outlet for expelling exhaust gas from said housing.

4. The apparatus of claim 3, wherein the temperature of said exhaust gas does not exceed 50° C. when said coolant system is in operation.

5. The apparatus of claim 3, wherein said coolant system maintains said user interface surface at a temperature not exceeding 50° C. when said apparatus is in operation.

6. The apparatus of claim 3, wherein the gas outlet is used to dilute the exhaust gases of the fuel cell and the fuel reformer.

7. The apparatus of claim 6, where the exhaust gas from the fuel cell includes hydrogen.

8. The apparatus of claim 6, where the exhaust gas from the fuel reformer includes Carbon monoxide, hydrocarbon gases and hydrogen.

9. The apparatus of claim 1, wherein said housing comprises a user interface surface which is exposed when said housing is placed within said vehicle receptacle tray, wherein said fuel inlet is located on said user interface surface.

10. The apparatus of claim 1, further comprising a controller positioned within said housing for regulating operation of said fuel cell depending upon the state of charge of said energy storage device.

11. The apparatus of claim 1, wherein said energy storage device comprises at least one battery.

12. The apparatus of claim 1, wherein said energy storage device comprises at least one capacitor.

13. The apparatus of claim 1, further comprising a DC/DC power converter positioned within said housing for converting DC current generated by said fuel cell to a voltage suitable for charging said energy storage device.

* * * * *